United States Patent
Jibbe et al.

(10) Patent No.: US 10,073,774 B2
(45) Date of Patent: Sep. 11, 2018

(54) MANAGING INPUT/OUTPUT OPERATIONS FOR SHINGLED MAGNETIC RECORDING IN A STORAGE SYSTEM

(71) Applicant: NetApp, Inc., Sunnyvale, CA (US)

(72) Inventors: Mahmoud K. Jibbe, Wichita, KS (US); Keith Holt, Wichita, KS (US); Scott Terrill, Wichita, KS (US)

(73) Assignee: NETAPP, INC., Sunnyvale, CA (US)

(*) Notice: Subject to any disclaimer, the term of this patent is extended or adjusted under 35 U.S.C. 154(b) by 2 days.

(21) Appl. No.: 15/459,866

(22) Filed: Mar. 15, 2017

(65) Prior Publication Data
US 2017/0315913 A1 Nov. 2, 2017

Related U.S. Application Data

(60) Provisional application No. 62/329,783, filed on Apr. 29, 2016.

(51) Int. Cl.
*G06F 12/00* (2006.01)
*G06F 12/0802* (2016.01)
(Continued)

(52) U.S. Cl.
CPC .......... *G06F 12/0802* (2013.01); *G06F 12/10* (2013.01); *G11B 5/012* (2013.01); *G11B 20/10527* (2013.01); *G06F 3/067* (2013.01); *G06F 2212/1016* (2013.01); *G06F 2212/202* (2013.01); *G06F 2212/604* (2013.01); *G11B 2020/10657* (2013.01); *G11B 2020/10675* (2013.01)

(58) Field of Classification Search
None
See application file for complete search history.

(56) References Cited

U.S. PATENT DOCUMENTS

2017/0024160 A1* 1/2017 Feldman ................. G06F 3/064
2017/0083438 A1* 3/2017 Han ..................... G06F 12/0292
(Continued)

OTHER PUBLICATIONS

Beeler, B., "What is Shingled Magnetic Recording (SMR)?", 2015, retrieved from http://www.storagereview.com/what_is_shingled_magnetic_recording_smr, on Jun. 5, 2017, 3 pages.
(Continued)

*Primary Examiner* — Brian Peugh
(74) *Attorney, Agent, or Firm* — Haynes and Boone, LLP (57) ABSTRACT

A system and method for improving the management of data input and output (I/O) operations for Shingled Magnetic Recording (SMR) devices in a network storage system is disclosed. The storage system includes a storage controller that receives a series of write requests for data blocks to be written to non-sequential addresses within a pool of SMR devices. The storage controller writes the data blocks from the series of write requests to a corresponding sequence of data clusters allocated within a first data cache of the storage controller for a thinly provisioned volume of the pool of SMR devices. Upon determining that a current utilization of the first data cache's data storage capacity exceeds a threshold, the sequence of data clusters including the data blocks from the first data cache are transferred to sequential physical addresses within the SMR devices.

20 Claims, 5 Drawing Sheets (51) Int. Cl.
*G11B 5/012* (2006.01)
*G06F 12/10* (2016.01)
*G11B 20/10* (2006.01)
*G06F 3/06* (2006.01)

(56) References Cited

U.S. PATENT DOCUMENTS

2017/0206161 A1* 7/2017 Feldman ............. G06F 12/0811
2017/0255556 A1* 9/2017 Peng .................. G06F 12/0815

OTHER PUBLICATIONS

Campello, J., "SMR: The Next Generation of Storage Technology", Storage Development Conference, SNIA, Santa Clara, CA 2015, 20 pages.
Jibbe, M.K., et al., "Method to Enhance the Performance of a Storage Array System with SSD Drives", Storage Development Conference, SNIA, Santa Clara, CA, 2014, 24 pages.

* cited by examiner

MANAGING INPUT/OUTPUT OPERATIONS FOR SHINGLED MAGNETIC RECORDING IN A STORAGE SYSTEM

CROSS-REFERENCE TO RELATED APPLICATIONS

This application claims priority to U.S. Provisional Application No. 62/329,783, filed on Apr. 29, 2016, which is incorporated herein by reference in its entirety.

TECHNICAL FIELD

The present description relates to data storage systems, and more specifically, to techniques for supporting Shingled Magnetic Recording (SMR) drives in a storage system.

BACKGROUND

A network storage system typically provides multiple user devices access to one or more storage devices for recording and retrieving digital information. The storage system may be implemented according to a storage area network (SAN) architecture in one example. In a SAN, the storage system provides a remote host with block-level access to data stored in an array of interconnected mass storage devices, e.g., hard disk drives (HDDs). A network storage system may also include Network Attached Storage (NAS) or other appropriate architectures. Conventional HDDs use Perpendicular Magnetic Recording (PMR) technology to record data on non-overlapping parallel magnetic tracks. However, there are difficulties with scaling PMR drive capacity due to physical limitations inherent in the current recording process.

Shingled Magnetic Recording (SMR) is a new hard drive technology that was developed to overcome the scalability issues associated with PMR drives. SMR technology uses partially overlapping magnetic tracks that are layered on top of one another similar to roof shingles on a house. By increasing the platter density or tracks per inch (TPI) in this way, SMR technology allows a drive's storage capacity to be increased without increasing its physical size. Due to the track layout within an SMR drive, data is typically written sequentially in order to prevent the drive's write head from writing over previously recorded data on overlapping tracks.

The operating systems of existing storage systems and host devices generally are not restricted to writing data sequentially to hard drives. Consequently, changes may have to be made in the SMR drive firmware, host software, or both to manage non-sequential or random writes to the SMR drives in a storage system. However, the use of conventional SMR data management techniques may cause hardware compatibility issues and unpredictable system performance.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for improving the management of data input and output (I/O) operations for Shingled Magnetic Recording (SMR) devices in a network storage system, such as a storage area network (SAN) or other appropriate system. In an embodiment, a storage controller of a storage system manages data flow between one or more hosts and a pool of SMR devices. The storage controller receives requests from each host to write or read data to or from the SMR device pool. The storage controller uses a data cache, e.g., a dynamic random access memory (DRAM), as an indirection layer to convert non-sequential write requests received from the host(s) into sequential writes for a thinly provisioned volume (also referred to herein as a "thin volume") that is stored in a data repository on the SMR device pool.

In one example, the non-sequential write requests may be received by the storage controller as a series of requests from the host(s) for writing data blocks to corresponding non-sequential storage locations or logical block addresses (LBAs) of the thinly provisioned volume within the data repository on the SMR device pool. The storage controller in this example uses the data cache to accumulate the data blocks from the non-sequential write requests and sequentially writes the accumulated data blocks from the data cache to a corresponding sequence of data clusters allocated to the thinly provisioned volume. Upon determining that a current utilization of the first data cache's assigned capacity for storing data exceeds a predetermined threshold, the data cache is flushed and the sequence of data clusters is transferred from the data cache to the repository in the SMR device pool. The sequence of data clusters is written to the SMR devices so that contiguous blocks of data are written to adjacent locations on the SMR devices.

In an embodiment, the storage controller maintains an index that maps the LBAs of the respective data blocks to their corresponding locations within the allocated portion of the thinly provisioned volume. The index may be maintained as part of metadata used by the storage controller for managing the contents of host data within the thinly provisioned volume and tracking the current utilization of the first data cache's data storage capacity. The metadata may be written to the SMR device pool and stored within a secondary cache, e.g., a solid-state drive (SSD), of the storage controller for faster access. The SSD cache may also be used as a read cache to store data blocks that were previously read from the SMR device pool so as to reduce the number of times the SMR device pool is accessed and improve read performance for future read requests.

Figure 1:
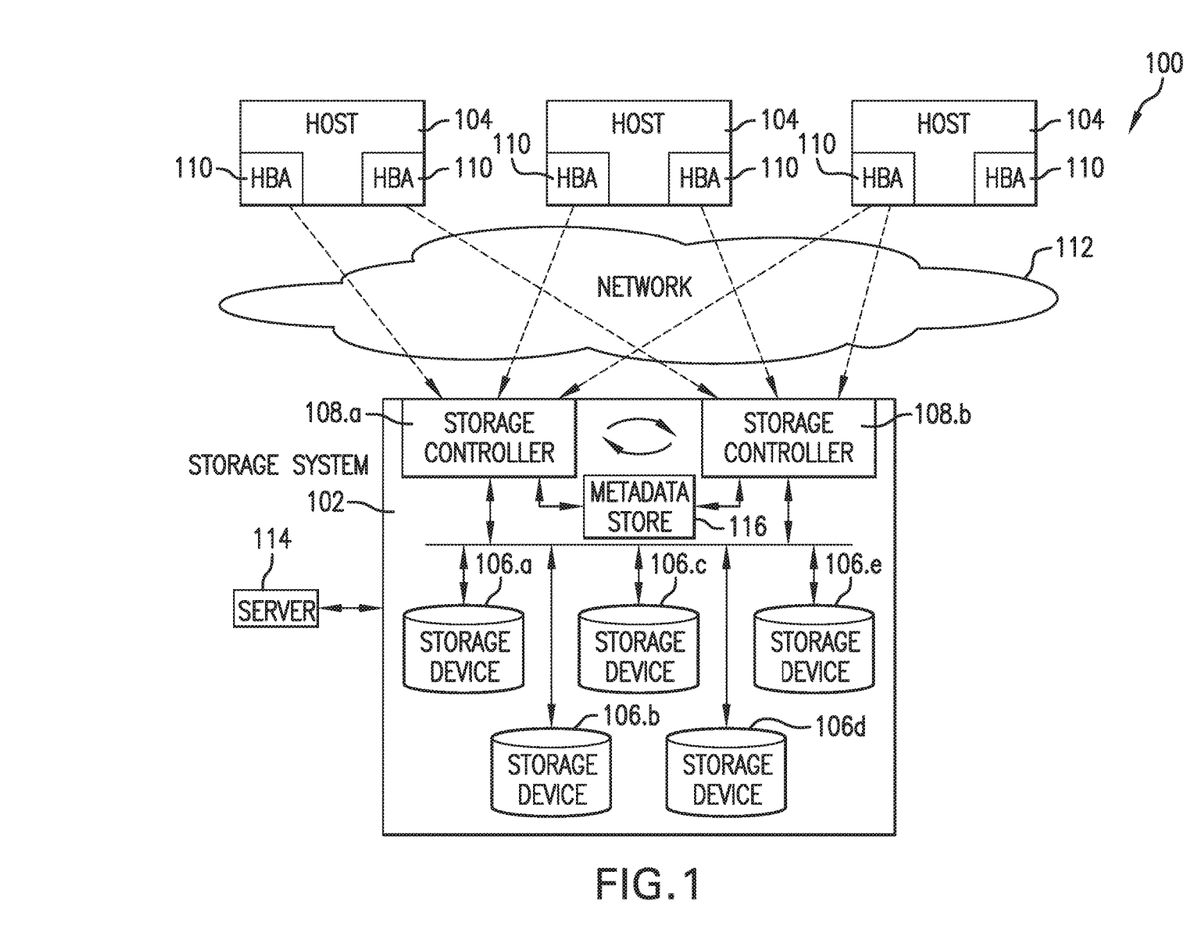
FIG. 1 is an organizational diagram of an exemplary data storage architecture according to aspects of the present disclosure.

FIG. 1 illustrates a data storage architecture 100 in which various embodiments may be implemented. Specifically, and as explained in more detail below, one or both of the storage controllers 108.a and 108.b read and execute computer readable code to perform the methods described further herein to manage I/O operations initiated by one or more hosts for writing and reading data blocks to and from a pool of SMR devices in network storage system.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions from one or more of the hosts 104 via a communication network 112. Such transactions may be, for example, requests to write and/or read data from one or more storage devices 106. Accordingly, the storage system 102 may take an appropriate action, for example, reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as a random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 includes any number of storage devices 106 and responds to one or more hosts 104's data transactions or data I/O requests so that the storage devices 106 may appear to be directly connected (or local) to the hosts 104. In various examples, the storage devices 106 include various hard disk drives (HDDs), solid state drives (SSDs), optical drives, and/or any other suitable volatile or non-volatile data storage medium. In an embodiment, the HDDs are SMR drives as described above. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance. In some implementations, the storage devices 106 may include a combination of SMR drives and Perpendicular Magnetic Recording (PMR) hard drives.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. For the storage devices 106 that are SMR drives, storage controllers 108.a, 108.b may support various SMR standards and protocols for interfacing with such devices including, for example, Zoned Block Commands (ZBC) and Zone ATA Commands (ZAC). The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In an embodiment, the storage system 102 may group the storage devices 106 using a dynamic disk pool (DDP) (or other declustered parity) virtualization technique. In an example DDP, volume data, protection information, and spare capacity are distributed across all of the storage devices included in the pool. As a result, each of the storage devices in the DDP remain active, and spare capacity on any given storage device is available to all volumes existing in the DDP. Each storage device in the DDP is logically divided up into one or more data extents at various block addresses of the storage device. A data extent is assigned to a particular data stripe of a volume.

An assigned data extent becomes a "data piece," and each data stripe has a plurality of data pieces, for example sufficient for a desired amount of storage capacity for the volume and a desired amount of redundancy, e.g. RAID 0, RAID 1, RAID 10, RAID 5 or RAID 6 (to name some examples). As a result, each data stripe appears as a mini RAID volume, and each logical volume in the disk pool is typically composed of multiple data stripes. Further, according to embodiments of the present disclosure, one or more data stripes may compose a given segment as used herein (i.e., a segment may include some integer number of data stripes). The number of data stripes in a segment may vary, e.g., depending on system capacity (e.g., 10 GB). However, it should be appreciated that the size of a segment or a data stripe may be set to any size as appropriate or desired for a particular implementation.

In addition, the storage system 102 may also include a metadata store 116. The metadata store 116 may be composed of one or more storage devices, such as one or more SSDs. The metadata store 116 may serve to store metadata regarding data (e.g., written from one or more hosts 104) in the storage devices 106. In an embodiment, write data may be received from one or more hosts 104 and momentarily stored in a write-back cache of the storage system 102. Such a write-back cache may be, for example, a portion of a DRAM of the storage system 102 that is allocated for a data cache and managed in a way that is optimal for staging data to be written to SMR drives. The metadata store 116 may house one or more types of metadata to facilitate translating the specified LBAs of the data in the write-back cache to block addresses used by the storage devices 106. In an embodiment, the metadata includes an index that maps the memory addresses of data blocks in the write-back cache to virtual LBAs of a thinly provisioned volume stored within a repository created on the SMR device pool. In a further embodiment, the metadata also includes an index that maps the virtual LBAs for different data blocks in the thinly provisioned volume to their corresponding physical locations within the repository on the SMR device pool. The mapping of virtual logical blocks in the thinly provisioned volume to logical blocks on the SMR drives is performed when the data is received from the host(s) 104, e.g., as part of a series of write requests directed to non-sequential addresses within the pool of SMR devices. In this manner, the data cache may be used as an indirection layer to write data from non-contiguous virtual logical blocks to sequential physical blocks in the SMR device pool.

For example, the metadata store 116 may include a tree data structure that facilitates translation of a specified volume/LBA block addresses (the physical locations) used for the storage devices 106. The metadata store 116 may also include information for monitoring a current utilization of the first data cache's capacity for storing data. Such a data storage capacity may be some amount of storage space provisioned for the thinly provisioned volume (i.e., a repository) for storing data from one or more of the hosts 104 to the storage devices 106 that are SMR drives within the storage system 102.

The different information destined for the metadata store 116 may be addressed into the metadata store 116 with metadata block addresses associated with metadata objects. When a new version of data already stored in one or more of the storage devices 106 is received at the storage system 102 for storage, that data may be written to a new segment, e.g., where the data is currently being sequentially written in accordance with embodiments of the present disclosure. As a result, the old mapping in the tree data structure may be removed, and the reference count for the block address where the data is stored in the storage devices 106 may be decremented.

In the present example, storage controllers 108.*a* and 108.*b* are arranged as an HA pair. Thus, when storage controller 108.*a* performs a write operation for a host 104, storage controller 108.*a* may also sends a mirroring I/O operation to storage controller 108.*b*. Similarly, when storage controller 108.*b* performs a write operation, it may also send a mirroring I/O request to storage controller 108.*a*. Each of the storage controllers 108.*a* and 108.*b* has at least one processor executing logic to perform the indirect buffered data block management techniques disclosed herein for handling block-level I/O operations between one or more of the hosts 104 and SMR storage devices within the storage system 102.

In an embodiment, the storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size.

In an embodiment, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), e.g., a thinly provisioned volume for a pool of SMR drives. In some implementations, certain configuration actions described with respect to server 114 may be carried out by any one or more of the hosts 104 in FIG. 1 or other computing devices (not shown) without departing from the scope of the present disclosure.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.*a*, 108.*b* of the storage system 102. The HBA 110 provides an interface for communicating with the storage controller 108.*a*, 108.*b*, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Area Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.a, 108.b). However, it should be understood that the scope of present disclosure is not limited to only block-level protocols or only file-level protocols or only object-based protocols, and in many embodiments, the storage system 102 is responsive to a number of different memory transaction protocols.

Embodiments of the present disclosure, including the techniques disclosed herein for supporting SMR devices in the storage system 102 of FIG. 1, may be implemented within, for example, a firmware of each of the storage controllers 108.a and 108.b of the storage system 102. For example, one or both of the storage controllers 108.a, 108.b may provide a buffered indirection layer using a thinly provisioned volume for managing block-level I/O operations between the hosts 104 and a pool of SMR devices within the storage system 102.

Figure 2:
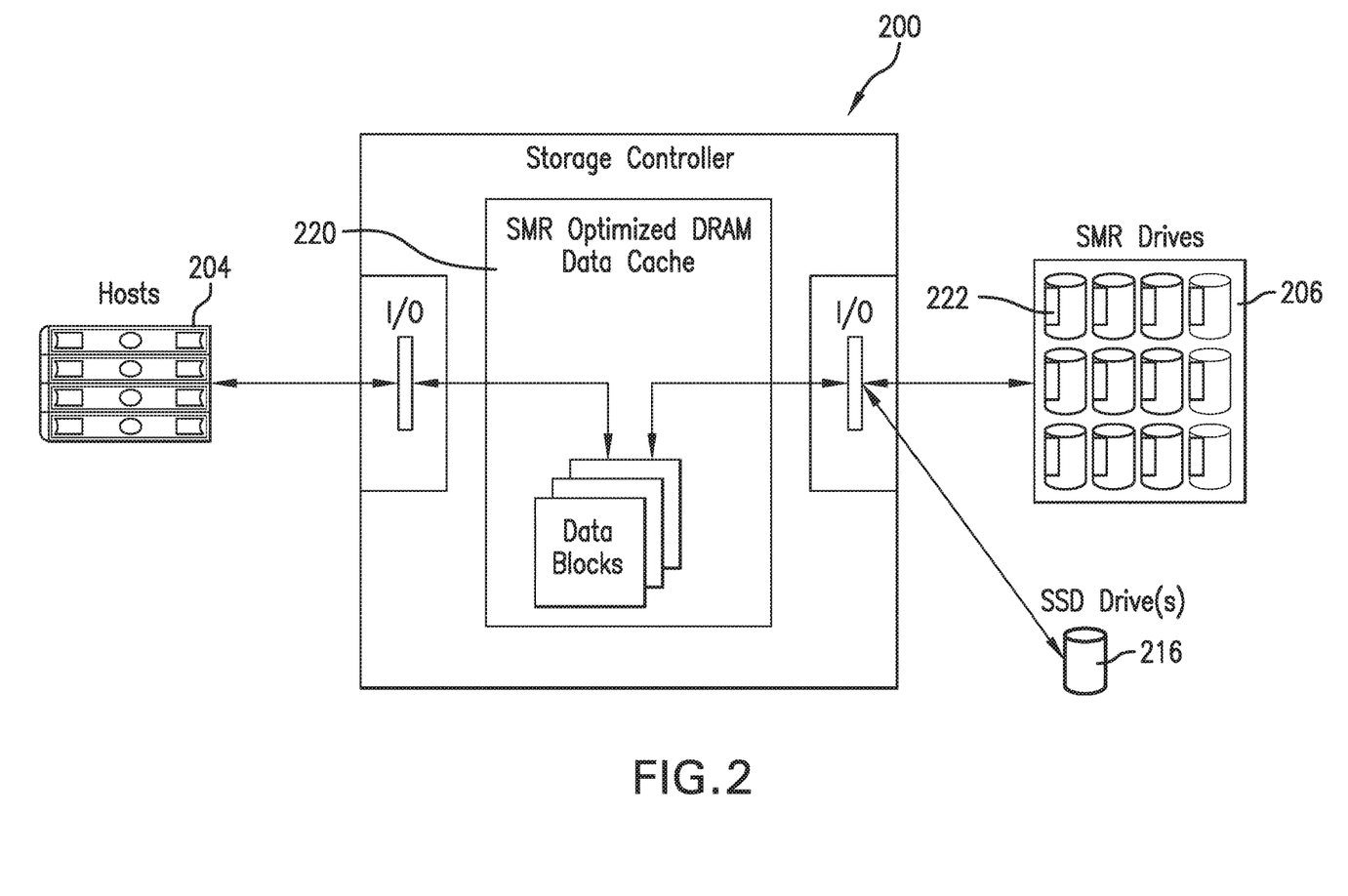
FIG. 2 is an organizational diagram of an exemplary storage controller architecture for managing data flow between host computing devices and Shingled Magnetic Recording (SMR) devices within a network storage system, according to aspects of the present disclosure.

FIG. 2 is an organizational diagram illustrating an example of a storage controller architecture that may be used to implement the above-described SMR device management functionality within one or more of the storage controllers 108.a and 108.b of the storage system 102 of FIG. 1, as described above. As shown in FIG. 2, a storage controller 200 includes a data cache 220. In an embodiment, the data cache 220 may be an optimized DRAM data cache of the storage controller 200 for managing block-level I/O operations between one or more host devices 204 and a pool of SMR devices 206.

During operation, the storage controller 200 receives I/O requests from the one or more hosts 204. The I/O requests may include requests for reading data blocks from the SMR devices 206 and/or requests for writing data blocks to the SMR devices 206. Each write request from the hosts 204 specifies a corresponding logical block address to which a data block is to be written. In an embodiment, the logical block address may be a virtual block address within a thinly provisioned volume (or thin volume) 222 that is stored in a repository created on the pool of SMR devices 206. While the thin volume 222 is described in the context of a single repository, it should be appreciated that the repository may be distributed across multiple SMR drives 206 in the pool. This example assumes that the write requests received from the hosts 204 include requests for writing a plurality of data blocks to non-sequential logical block addresses within the thinly provisioned volume stored on the SMR devices 206.

In an embodiment, the storage controller 200 uses a portion of the data cache 220 that is allocated for a thinly provisioned volume (or thin volume) 222 of the pool of SMR device 206 to convert such non-sequential write requests from the hosts 204 into sequential writes for the pool of SMR device 206. Thus, the data cache 220 of the storage controller 200 may serve as an indirection layer that supports sequential writes within the storage system, e.g., the storage system 102 of FIG. 1, as described above. The thin volume 222 may provide variable address mapping or translation between a range of LBAs and physical addresses associated with the pool of SMR devices 206. The range of LBAs may correspond to an allocated portion of a virtual address space of the thin volume 222 to which data blocks may be written in sequential order.

Continuing with this embodiment, the thin volume 222 exposes a virtual capacity to the I/O-attached hosts 204 of the storage controller 200, but does not require that all of the virtual capacity be associated with physical capacity on the pool of SMR devices 206. Thus, the virtual capacity of the thin volume 222 can be greater than its allocated (or "provisioned") physical capacity. When the thin volume 222 is first created, it will contain the logical equivalent of zero-filled blocks for its entire virtual LBA space. It will also contain some amount of provisioned capacity that can be used to satisfy ensuing write requests from the hosts 204. As write requests arrive for block ranges that have never before been written, capacity is drawn from the provisioned space for the thin volume 222 and used to save data from the hosts 204. As this causes some amount of the provisioned data storage capacity to be "consumed" or utilized, the amount of "unconsumed" provisioned capacity available for ensuing writes to previously-unwritten LBA ranges is reduced.

The provisioned capacity of the thin volume 222 is used by the storage controller 200 to sequentially write data blocks from the non-sequential write requests received from the hosts 204. This may include mapping the data blocks from a virtual address space representing the virtual capacity of the thin volume 222 to a provisioned address space of the thin volume 222 within the data cache 220.

Figure 3:
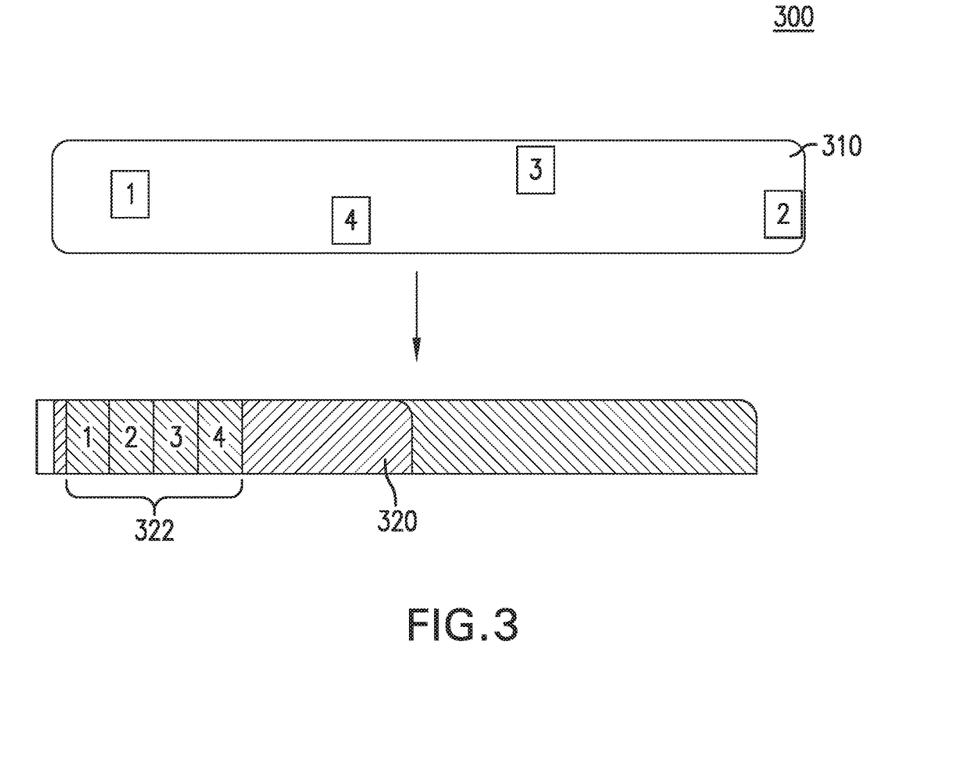
FIG. 3 is a diagram illustrating an example of mapping non-sequential data blocks to a sequence of clusters allocated within a virtual address space of a thinly provisioned volume, according to aspects of the present disclosure.

FIG. 3 illustrates an example of such a mapping for a thin volume's virtual address space. In particular, FIG. 3 shows the relative locations of four data blocks within a virtual address space 310 of a thin volume, e.g., the thin volume 222 of FIG. 2, created for a pool of SMR devices. The virtual address space 310 in this example may represent a 32 GB virtual space of 0x4000000 block addresses. Block 1 may correspond to address 0x4B000, block 2 to address 0x2316000, block 3 to address 0x1831000, and block 4 to address 0x931000. As the blocks are to be written to non-sequential addresses within the virtual address space 310, the disclosed data block management techniques may be used to convert the non-sequential writes to sequential writes by writing blocks 1-4 sequentially to a provisioned portion 320 of the thin volume's virtual address space 310. The provisioned space 320 may represent a provisioned capacity or repository of the thin volume for storing data from host-initiated write requests. Such a repository may be created within a data cache of a storage controller (e.g., data cache 220 of storage controller 200 of FIG. 2, as described above). In an embodiment, the blocks may be written to a corresponding sequence of data clusters 322 allocated within the provisioned space 320 of the thin volume in this example. Each data cluster in the sequence of data clusters 322 may correspond to a different address range within the pool of SMR devices 206.

Referring back to FIG. 2, metadata relating to such data clusters of the thin volume 222 may be stored by the storage controller 200 within one or more SSD devices 216 coupled thereto. The SSD devices 216 may serve as a second data cache of the storage controller 200 for storing such metadata. In an embodiment, the stored metadata includes an index that maps the corresponding addresses of the data blocks within the pool of SMR devices 206 to the locations of the data blocks written to the sequence of data clusters (e.g., clusters 322 of FIG. 3) allocated for the thinly provisioned volume within the data cache 220 of the storage controller 200. In a further embodiment, the metadata also includes information used by the storage controller 200 for monitoring a current utilization of the data storage capacity of the data cache 220. The current utilization may be monitored based on a total number of data clusters allocated within the data cache 220 for the thin volume 222. Upon determining that the current utilization of the data storage capacity of the data cache 220 exceeds a threshold, the storage controller 200 flushes the data cache 220 by transferring the sequence of data clusters including the data blocks from the data cache 220 to the pool of SMR devices 206. In an embodiment, the threshold is based on an SMR zone size associated with the pool of SMR devices 206.

In some implementations, each request to write a data block from the hosts 204 triggers an index lookup by storage controller 200 to determine if a data cluster corresponding to the affected LBA range has already been allocated for the thin volume 222 within the data cache 220. If so, at least a portion of the previously allocated cluster within the data cache 220 may be modified to include the host-provided data block. For instance, the portion of the previously allocated data cluster may be modified by overwriting any existing content of the data cluster with the host-provided data block. Alternatively, the data block may be written to the portion of the previously allocated data cluster such that the data block overlays any existing content of the previously allocated data cluster within the data cache 220.

If a previously allocated cluster is determined not to exist for the thin volume 222 within the data cache 220, a new cluster is allocated, the data from the hosts 204 is written to the cluster as described above, and appropriate updates are made to the stored metadata, including the index and utilization information, within the SSD devices 216. It should be noted that index updates may be needed only the first time a data cluster is allocated and that subsequent writes (or overwrites) of such a cluster may be made without further updating the index.

To improve system performance, various data caching techniques that are optimized for the SMR devices 206 may be employed using the data cache 220. Such data caching techniques may include, for example, flushing the data cache 220 on demand rather than based on the age of the data stored therein. Such demand flushing of the data cache 220 allows larger amounts of data to be accumulated within the cache before being written to the SMR devices 206. This maximizes sequential writes to the SMR devices 206 and reduces the number of potential read-modify-write (RMW) updates to the data stored within the SMR devices 206. Accordingly, such techniques may help to increase SMR endurance and extend the life of the SMR devices 206. To further improve performance, the SSD devices 216 may be used as a SSD read cache for storing data blocks read from the SMR devices 206 in response to data read requests received by the storage controller 200 from the hosts 204.

Figure 4:
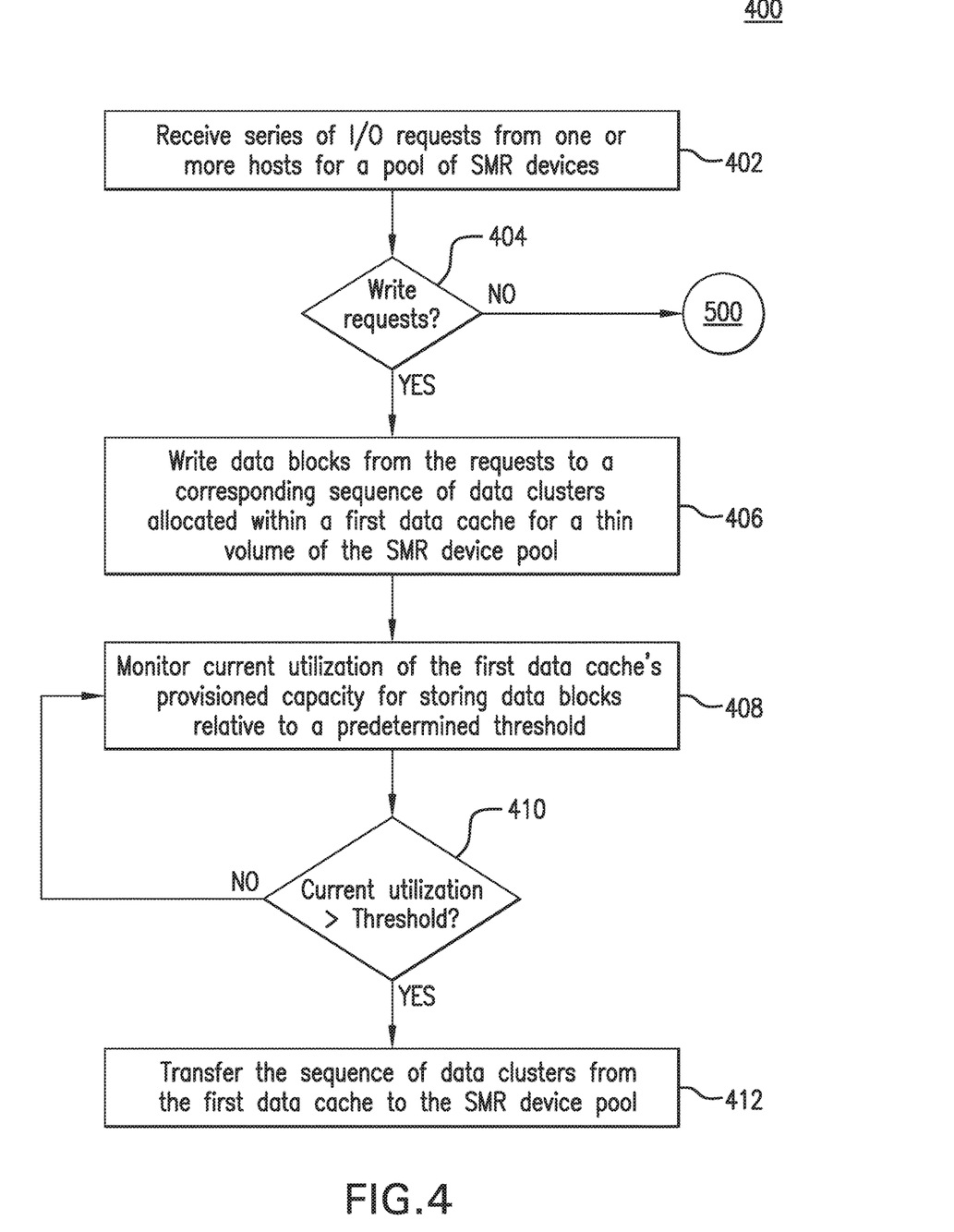
FIG. 4 is a flow diagram of a method of managing host requests for writing data to a pool of SMR devices within a network storage system, according to aspects of the present disclosure.

FIG. 4 is a flow diagram of a method 400 for managing host requests for writing data to a pool of SMR devices, e.g., SMR devices 206 of FIG. 2, according to aspects of the present disclosure. In the description of FIG. 4, reference is made to the storage controller 200 of FIG. 2, as described above, for purposes of illustration. However, method 400 is not intended to be limited thereto, and it is understood that other storage controller(s) may be configured to perform the same functions when performing a pertinent requested operation. In an embodiment, the method 400 may be implemented by one or more processors of the storage controller 200, executing computer-readable instructions to perform the functions described herein. It is understood that additional steps can be provided before, during, and after the steps of method 400, and that some of the steps described can be replaced or eliminated for other embodiments of the method 400.

At block 402, the storage controller 200 receives a series of I/O requests from one or more hosts, e.g., hosts 204 of FIG. 2, for the pool of SMR devices. At decision block 404, the storage controller 200 determines whether or not the requests include a series of write requests for writing data blocks to corresponding addresses within the pool of SMR devices. If it is determined at block 404 that such a series of write requests has been received and that the data blocks in the series of write requests are to be written to non-sequential addresses within the pool of SMR devices, the method 400 proceeds to block 406.

At block 406, the storage controller 200 writes data blocks from the write requests to a corresponding sequence of data clusters allocated within a first data cache, e.g., the data cache 220, of the storage controller 200 for the thin volume 222 of the pool of SMR devices. As described above, the storage controller 200 stores metadata relating to the data clusters allocated for the thinly provisioned volume within the data cache 220 of the storage controller 200. The metadata may be stored to a second data cache of the storage controller 200. The second data cache may be, for example, the SSD device(s) 216 of FIG. 2, as described above.

In an embodiment, the stored metadata includes an index mapping the corresponding addresses of the data blocks within the pool of SMR devices to the locations of the data blocks written to the sequence of data clusters allocated for the thin volume 222 within the data cache 220 of the storage controller 200. In a further embodiment, the stored metadata also includes information relating to a current utilization of a data storage capacity of the data cache 220, i.e., the data cache's provisioned capacity for storing data blocks for the thin volume 222. The current utilization may be based on a total number of data clusters allocated within the data cache 220 for the thin volume 222.

At block 408, the storage controller 200 uses the stored metadata to monitor the current utilization of the capacity of the data cache 220 relative to a threshold. In an embodiment, the threshold is based on an SMR zone size associated with the pool of SMR devices. At decision block 410, the storage controller 200 determines whether or not the current utilization being monitored exceeds the threshold. If at block 410 it is determined that the current utilization exceeds the threshold, method 400 proceeds to block 412.

At block 412, the storage controller 200 transfers the sequence of data clusters from the data cache 220 to the pool of SMR devices. For example, the operation at block 412 may include flushing the data cache 220 such that the data transfer is optimized for the SMR devices, e.g., using the demand flushing techniques described above. In this example, the flushing includes using sequential write operations to write contiguous blocks of data to adjacent physical locations on the SMR devices. The data may be written to the SMR devices according to any appropriate technique, such as a RAID level, DDP techniques, and the like. In an embodiment, the storage controller 200 issues appropriate ZBC/ZAC commands to discover the appropriate configuration for each SMR disk zone and the position of the zone's write pointer. The storage controller 200 may then use the discovered information to write each data cluster to a corresponding physical location (e.g., sector) within a zone of the SMR devices. As the data clusters are transferred from the data cache 220 to the SMR devices, the storage controller 200 may store additional metadata to map or remap the LBAs associated with the clusters to corresponding physical addresses (e.g., sector locations) within SMR devices.

In an embodiment, each data cluster in the sequence of data clusters within the data cache 220 corresponds to a different address range within the pool of SMR devices. Accordingly, the write operation at block 406 may include searching the index within the stored metadata to determine whether or not a previously allocated data cluster of the thin volume exists for an address range that includes the address specified for each of the data blocks. If such a previously allocated data cluster is determined to exist within the data cache for the address range including an address of a particular data block, at least a portion of the previously allocated data cluster within the data cache 220 is modified to include the particular data block.

However, if such a previously allocated data cluster is determined not to exist within the first data cache, the storage controller 200 allocates a new data cluster to which a corresponding data block is to be written for the thin volume 222 within the data cache 220. The storage controller 200 writes the data block to the new data cluster that has been allocated within the data cache 220. The storage controller 200 may then update the index and the current utilization information included within the stored metadata for the data cache 220 accordingly.

Figure 5:
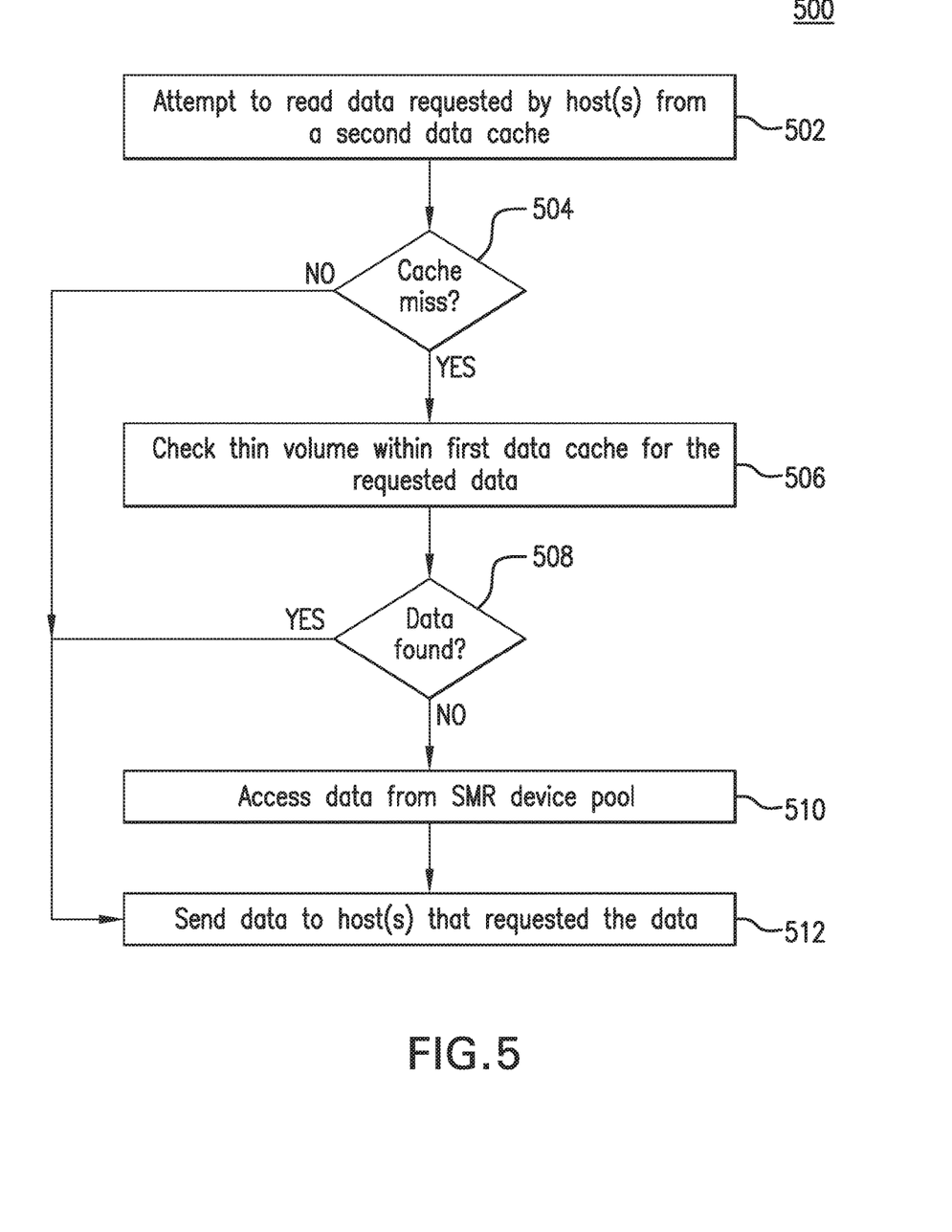
FIG. 5 is a flow diagram of a method of managing host requests for reading data from the pool of SMR devices of FIG. 4, according to aspects of the present disclosure.

If at decision block 404 it is instead determined that one or more of the requests received from the host(s) are read requests for reading one or more data block stored within the pool of SMR devices, the method 400 proceeds to a method 500 of FIG. 5 for managing the read requests, according to aspects of the present disclosure. Like method 400 of FIG. 4, the method 500 will be described using the storage controller 200 of FIG. 2, as described above, but is not intended to be limited thereto.

As shown in FIG. 5, the method 500 begins at block 502, in which the storage controller 200 attempts to read data requested by the host(s) from the second data cache, e.g., the SSD devices 216 of FIG. 2, as described above. The second data cache in this example is used a read cache for storing data blocks read from the SMR device pool in response to prior read requests received by the storage controller 200 from the host(s).

At decision block 504, if it is determined that a cache miss occurs, i.e., the requested data cannot be found in the second data cache, the method 500 proceeds to block 506. At block 506, the storage controller 200 checks the thin volume 222 within the data cache 220 for the requested data. If, at decision block 508, it is determined that the requested data was not found within the data cache 220, the method proceeds to block 510, at which the storage controller 200 accesses the data from the SMR device pool. At block 512, the storage controller 200 sends the data from the SMR device pool to the host(s). However, if it is determined at block 508 that the requested data was found within the data cache 220, the method 500 proceeds directly to block 512 and sends the data from the data cache 220 to the host(s).

As a result of the elements discussed above, embodiments of the present disclosure improve upon storage system technology. For example, the disclosed data management techniques allow a storage system to support host-initiated I/O operations for SMR devices without having to make extensive changes in the controller firmware or host software. Further, the disclosed techniques improve the storage system's performance by converting non-sequential or random write requests into sequential writes that are optimized for the SMR devices within the storage system. As such techniques are implemented directly within the storage controller's firmware, performance improvements can be achieved while maintaining backward compatibility with existing host systems.

In some embodiments, the computing system is programmable and is programmed to execute processes including the processes of methods 400 and 500 of FIGS. 4 and 5, respectively, as described herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
receiving, by a storage controller from one or more host devices, a series of write requests for data blocks to be written to corresponding addresses within a pool of Shingled Magnetic Recording (SMR) devices of a network storage system, each write request in the series specifying a corresponding virtual address within a thinly provisioned volume of the pool of SMR devices to which a data block is to be written, further wherein the data blocks in the series of write requests are directed to non-sequential virtual addresses within the thinly provisioned volume of the pool of SMR devices;
in response to the series of write requests, writing the data blocks from the series of write requests to a corresponding sequence of data clusters allocated within a first data cache of the storage controller for the thinly provisioned volume of the pool of SMR devices;
mapping the non-sequential virtual addresses of the data blocks from the series of write requests to sequential physical addresses within the pool of SMR devices; and
upon determining that a current utilization of a data storage capacity of the first data cache exceeds a threshold, transferring the sequence of data clusters including the data blocks from the first data cache to the sequential physical addresses within the pool of SMR devices.

2. The method of claim 1, wherein the threshold for the current utilization of the first data cache's data storage capacity is based on an SMR zone size associated with the pool of SMR devices.

3. The method of claim 1, wherein the first data cache is a dynamic random access memory (DRAM) of the storage controller.

4. The method of claim 1, further comprising:
storing, within a second data cache, metadata relating to the data clusters allocated for the thinly provisioned volume within the first data cache of the storage controller.

5. The method of claim 4, wherein the second data cache includes one or more SSD devices coupled to the storage controller.

6. The method of claim 5, further comprising:
receiving, by the storage controller from the one or more host devices, data read requests for data blocks to be read from the pool of SMR devices;
reading the data blocks from the pool of SMR devices, based on the received read requests; and
using the one or more SSD devices of the second data cache as a SSD read cache to store the data blocks that are read from the pool of SMR devices.

7. The method of claim 4, wherein the metadata includes an index mapping the corresponding addresses of the data blocks within the pool of SMR devices to locations of the data blocks written to the sequence of data clusters allocated for the thinly provisioned volume within the first data cache of the storage controller.

8. The method of claim 4, further comprising:
monitoring, by the storage controller, the current utilization of the first data cache's data storage capacity based on a total number of data clusters allocated within the first data cache for the thinly provisioned volume; and
storing, within the metadata, information related to the current utilization of the first data cache, based on the monitoring.

9. The method of claim 8, wherein modifying the portion of the previously allocated data cluster comprises overwriting any existing content of the previously allocated data cluster with the other data block.

10. The method of claim 8, wherein modifying the portion of the previously allocated data cluster comprises writing the other data block to the portion of the previously allocated data cluster such that the other data block overlays any existing content of the previously allocated data cluster within the first data cache.

11. The method of claim 1, wherein each data cluster in the sequence of data clusters within the first data cache corresponds to a different address range within the pool of SMR devices, and the writing of the data blocks comprises:
determining whether or not a previously allocated data cluster within the first data cache exists for an address range that includes the corresponding virtual address specified for each of the data blocks;
in response to determining that the previously allocated data cluster exists within the first data cache for the address range including an address of a particular one of the data blocks, modifying at least a portion of the previously allocated data cluster within the first data cache to include the particular data block; and
in response to determining that the previously allocated data cluster does not exist within the first data cache for an address of another one of the data blocks:
allocating a new data cluster to which the other data block is to be written within the first data cache;
writing the other data block to the new data cluster allocated within the first data cache;
mapping the other data block's address within the first data cache to the corresponding virtual address within the thinly provisioned volume of the pool of SMR devices; and
storing metadata including information relating to the mapping of the other data block's address within the first data cache and the current utilization of the first data cache's data storage capacity, based on the allocation of the new data cluster and the writing of the other data block thereto.

12. A non-transitory machine readable medium having stored thereon instructions for performing a method comprising machine executable code which when executed by at least one machine, causes the machine to:
receive, from one or more host devices, a series of write requests for data blocks to be written to corresponding addresses within a pool of Shingled Magnetic Recording (SMR) devices of a network storage system, each write request in the series specifying a corresponding virtual address within a thinly provisioned volume of the pool of SMR devices to which a data block is to be written, further wherein the data blocks in the series of write requests are directed to non-sequential virtual addresses within the thinly provisioned volume of the pool of SMR devices;
write the data blocks from the series of write requests to a corresponding sequence of data clusters allocated within a first data cache of the storage controller for the thinly provisioned volume of the pool of SMR devices;
map the non-sequential virtual addresses of the data blocks from the series of write requests to sequential physical addresses within the pool of SMR devices;
monitor a current utilization of a data storage capacity of the first data cache; and
transfer the sequence of data clusters including the data blocks from the first data cache to the sequential physical addresses within the pool of SMR devices, when the current utilization is determined to exceed a threshold, based on the monitoring.

13. The non-transitory machine readable medium of claim 12, wherein the threshold for the current utilization of the first data cache's data storage capacity is based on an SMR zone size associated with the pool of SMR devices.

14. The non-transitory machine readable medium of claim 12, further comprising machine executable code that causes the machine to:
store, within a second data cache, metadata relating to the data clusters allocated for the thinly provisioned volume within the first data cache.

15. The non-transitory machine readable medium of claim 14, wherein the metadata includes an index mapping the corresponding addresses of the data blocks within the pool of SMR devices to the locations of the data blocks written to the sequence of data clusters allocated for the thinly provisioned volume within the first data cache.

16. The non-transitory machine readable medium of claim 14, further comprising machine executable code that causes the machine to:
receive, from the one or more host devices, data read requests for data blocks to be read from the pool of SMR devices;
read the data blocks from the pool of SMR devices, based on the received read requests; and
use the second data cache as a read cache to store the data blocks that are read from the pool of SMR devices.

17. A computing device comprising:
a memory containing machine readable medium comprising machine executable code having stored thereon instructions for performing a method of managing host-initiated input/output (I/O) operations for a pool of Shingled Magnetic Recording (SMR) devices within a network storage system; and
a processor coupled to the memory, the processor configured to execute the machine executable code to cause the processor to:
receive, from one or more host devices, a series of write requests for data blocks to be written to corresponding addresses within a pool of Shingled Magnetic Recording (SMR) devices of a network storage system, each write request in the series specifying a corresponding virtual address within a thinly provisioned volume of the pool of SMR devices to which a data block is to be written, further wherein the data blocks in the series of write requests are directed to non-sequential virtual addresses within the thinly provisioned volume of the pool of SMR devices;
write the data blocks from the series of write requests to a corresponding sequence of data clusters allocated within a first data cache of the storage controller for the thinly provisioned volume of the pool of SMR devices;
map the non-sequential virtual addresses of the data blocks from the series of write requests to sequential physical addresses within the pool of SMR devices;
monitor a current utilization of a data storage capacity of the first data cache; and
transfer the sequence of data clusters including the data blocks from the first data cache to the sequential physical addresses within the SMR devices, when the current utilization is determined to exceed a threshold, based on the monitoring.

18. The computing device of claim 17, wherein the threshold for the current utilization of the first data cache's data storage capacity is based on an SMR zone size associated with the pool of SMR devices.

19. The computing device of claim 17, the machine executable code further causing the processor to:
store, within a second data cache, metadata relating to the data clusters allocated for the thinly provisioned volume within the first data cache.

20. The computing device of claim 19, wherein the metadata includes an index mapping the corresponding non-sequential virtual addresses of the data blocks within the thinly provisioned volume of the pool of SMR devices to the data blocks' respective addresses in the sequence of data clusters allocated within the first data cache.

* * * * *